(12) United States Patent
Ver Hage

(10) Patent No.: US 7,156,264 B2
(45) Date of Patent: Jan. 2, 2007

(54) REMOVABLE CAP ASSEMBLY

(76) Inventor: Richard P. Ver Hage, 95 Oakdale Ct., North Haledon, NJ (US) 07508

(*) Notice: Subject to any disclaimer, the term of this patent is extended or adjusted under 35 U.S.C. 154(b) by 0 days.

(21) Appl. No.: 10/848,455

(22) Filed: May 17, 2004

(65) Prior Publication Data

US 2004/0231609 A1    Nov. 25, 2004

Related U.S. Application Data

(62) Division of application No. 10/302,733, filed on Nov. 22, 2002, now Pat. No. 6,786,179, which is a division of application No. 09/652,737, filed on Aug. 31, 2000, now Pat. No. 6,684,814.

(51) Int. Cl.
*B67D 5/60* (2006.01)

(52) U.S. Cl. ............... 222/464.1; 222/542; 119/72; 215/387; 220/705

(58) Field of Classification Search ............ 119/72.5, 119/72; 215/44, 318, 329, 341, 387, 388, 215/363; 220/254.1, 255, 256.1, 714, 705, 220/293, 288; 222/464.1, 211, 158, 420, 222/542, 464.3, 464.5
See application file for complete search history.

(56) References Cited

U.S. PATENT DOCUMENTS

| | | | | |
|---|---|---|---|---|
| 3,050,218 A | * | 8/1962 | Harvey | 222/498 |
| 3,149,611 A | * | 9/1964 | Harrison | 119/72.5 |
| 3,756,478 A | * | 9/1973 | Podell et al. | 222/420 |
| 5,059,188 A | * | 10/1991 | Goddard | 604/300 |
| 5,088,627 A | | 2/1992 | Musel | 222/145 |
| 5,271,524 A | * | 12/1993 | Marston | 222/1 |
| 5,769,254 A | | 6/1998 | King et al. | 215/330 |
| 5,810,185 A | * | 9/1998 | Groesbeck | 215/387 |
| 6,056,136 A | | 5/2000 | Taber et al. | 215/252 |
| 6,062,440 A | * | 5/2000 | Murray et al. | 222/464.1 |
| 6,158,603 A | | 12/2000 | Price et al. | 215/44 |
| 6,293,226 B1 | * | 9/2001 | Hwang | 119/72 |
| 6,382,444 B1 | | 5/2002 | Nyman | 215/252 |
| 6,415,935 B1 | | 7/2002 | Hins | 215/329 |
| 6,520,361 B1 | | 2/2003 | Joulia | 215/329 |
| 7,044,316 B1 | * | 5/2006 | Hsu | 215/11.1 |

* cited by examiner

*Primary Examiner*—Teri Pham Luu
*Assistant Examiner*—Joshua Michener
(74) *Attorney, Agent, or Firm*—Sofer & Haroun, LLP

(57) ABSTRACT

A removable cap assembly having a cap, a stopper and a sipper tube. The cap has a curved side wall which has an inner and outer surface. From this wall extends a top portion. A boss extends perpendicularly from the top portion. The boss has a bottom portion and a top portion. A circumferential rib extends perpendicularly from the top portion of the boss. The boss and rib define an opening in the cap. A stopper is provided that is dimensioned to seal the opening of the cap. The stopper is maintained in the cap by the boss and circumferential rib. The stopper includes a disc-shaped base and a cylindrical wall portion that extends therefrom. Additionally, a first groove that is dimensioned to receive the bottom portion of the boss is positioned in the base around the wall portion. Also, a second circumferential groove is positioned in the top portion of the wall portion. This second, groove is dimensioned to receive the rib. The stopper has a hole for receiving a sipper tube.

8 Claims, 8 Drawing Sheets

REMOVABLE CAP ASSEMBLY

RELATED APPLICATIONS

This application is a divisional application of allowed U.S. patent application Ser. No. 10/302,733, filed on Nov. 22, 2002, which in turn is a divisional application of application Ser. No. 09/652,737, now issued U.S. Pat. No. 6,684,814, originally filed on Aug. 31, 2000, the entirety of which are incorporated herein by reference.

FIELD OF THE INVENTION

This invention relates to an improved removable cap assembly for an animal feeding bottle.

BACKGROUND

Small rodents such as mice, rats, guinea pigs, and hamsters are used in scientific research and they are sometimes kept as pets by children. Typically, such animals are held in small cages where they are provided with nesting material along with food and water. Solid food is kept in a feeding device. So that the cage remains dry and relatively orderly, liquids, such as water and medicines, are usually stored in a special bottle with a dispensing device that allows small portions to be released to the animal.

A common type of dispensing device, widely used in the laboratory animal industry, is a sipper tube that is connected to a bottle filled with liquid. The tube points downward and is accessible to the animal. Often the hole in the tube is relatively small and, therefore, surface tension, along with a partial vacuum that is created in the bottle, prevents liquid from flowing freely from the bottle. Other sipper tubes include ball bearings disposed therein to block the hole at the bottom of the tube. The bearing is free to move—and when it does—it allows liquid to exit in a controlled manner.

In the prior art, it is well known that a sipper tube—such as the one just described—can be coupled to a bottle with a stopper made of rubber, neoprene, or another similar material. The stopper is placed in the mouth of the bottle where it is held by friction fit. Similarly, a hole in the stopper is dimensioned to hold the sipper tube by friction fit. With the bottle inverted, the sipper tube is accessible to an animal, and limited amounts of liquid can flow out of the bottle as needed.

The use of a simple friction fit between the stopper and the bottle has at least one major limitation. Because the bottle is inverted, the weight of the liquid tends to loosen the stopper. Furthermore, the stopper is loosened by vibrations and motion caused by an animal using the bottle. These loosening effects may eventually cause the stopper to come apart from the bottle, allowing liquid to escape. In some cases, animals attempt and sometimes succeed in removing stoppers from the bottle. In order to avoid these potentialities, stoppers are usually inserted into the bottle by hand with relatively high force. However, this action may cause health problems, such carpal tunnel syndrome, for a person who must repetitively insert stoppers into bottles. After all, typical laboratories utilize large quantities of these bottles and stoppers.

One example of a removable cap assembly is shown in U.S. Pat. No. 6,042,440 to Murray et al. This invention makes steps to overcome the limitations—discussed above—of standard, friction fit stoppers. The patent teaches an assembly that includes a stopper which has a neck disposed between two lip structures. The neck is dimensioned to receive a flange that is disposed on a cap. Finally, a sipper tube is provided which is positioned within a hole in the stopper, to extend through the opening. The patent also teaches a cap that needs to be turned only 180 degrees in order to seal the bottle.

While the device described in this patent helps to solve some problems inherent in prior art, at least one major limitation is intrinsic in its design. The lip and neck structure, which is held in place by a single circumferential flange, tends to lack rigidity. Thus, the problem remains that the sipper tube can be wriggled, allowing leakage of the bottle contents or the removal of the sipper tube. Moreover, wriggling of the sipper tube can allow air to enter the bottle, eliminating the partial vacuum and causing liquid to flow freely from the sipper tube. An additional concern with this prior art device is that the upper lip is exposed on the outside of the cap. The lip tends to collect dirt and germs which can be harmful to the animals or those handling the bottle assemblies.

Another problem with this prior art device is manner in which the seal is crated after the cap is turned 180 degrees. The 180 degree turn is achieved by having a single continuous thread on both the bottle and cap. The cap bottoms out after the cap has turned 180 degrees. As such, the cap is compressed along only half of the sealing surface.

Thus, what is needed is an improved removable cap assembly that overcomes prior art limitations. Specifically, these limitations include the rigidity and security with which the sipper tube is held by a stopper in the bottle. Additionally, problems with regard to cleanliness stem from design features in the prior art.

SUMMARY OF THE INVENTION

It is one object of the present invention to provide an improved removable cap assembly for use in conjunction with a bottle.

It is another object of the present invention to provide an improved removable cap assembly that can be easily attached to and detached from a standard threaded bottle.

It is still another object of the present invention to provide an improved removable cap assembly that provides a relatively rigid support for a sipper tube.

It is yet another object of the present invention to provide an improved removable cap assembly that has multiple thread starts for use in conjunction with threaded bottle.

Thus, according to one embodiment of the invention, a removable cap assembly comprising a cap, a stopper and a sipper tube. The cap has a curved side wall which has an inner and outer surface. From this wall extends a top portion. A boss extends perpendicularly from the top portion. The boss has a bottom portion and a top portion. A circumferential rib extends perpendicularly from the top portion of the boss. The boss and define an opening in the cap. A stopper is provided that is dimensioned to seal the opening of the cap. The stopper is maintained in the cap by the circumferential rib. The stopper includes a disc-shaped base and a cylindrical wall portion that extends therefrom. Additionally, a first groove that is dimensioned to receive the bottom portion of the boss, is positioned in the base around the wall portion. Also, a second circumferential groove is positioned in the top portion of the wall portion. This second groove is dimensioned to receive the circumferential rib. The stopper has a hole for receiving a sipper tube.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 1:
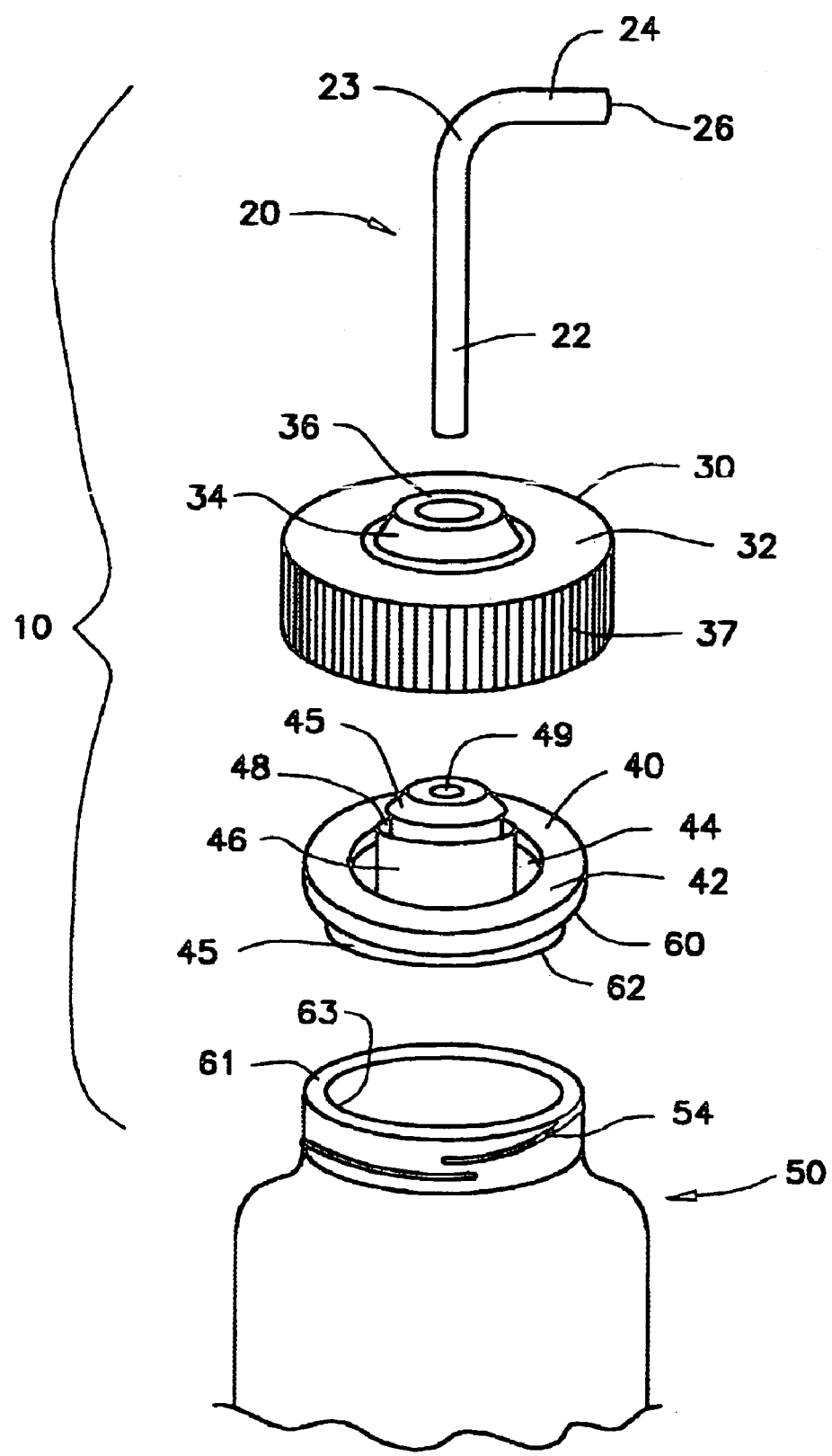
FIG. 1 is an exploded perspective view of a removable cap assembly constricted in accordance with one embodiment of the invention.

In accordance with one embodiment, the present invention is directed to a removable cap assembly 10. The salient features of the present invention, according to one embodiment, are shown in FIG. 1. Although not limited thereto, assembly 10 includes a sipper tube 20, a cap 30, and a stopper 40 that, together, can be coupled to a bottle mouth 50. The stopper fits in the cap to help provide a water tight sealing device for covering mouth 50. Tube 20 is then held by stopper 40 to provide an animal feeding bottle.

Sipper 20 can be one of many commercially available and well-known tube shaped devices that are designed to dispense small amounts of liquid on demand. The simplest of these devices, shown in FIG. 1, includes a vertical portion 22 and an angled portion 24 that is bent about an elbow 23. Tube 20 has a hole 26 at its end. The hole is dimensioned so that a relatively small amount of liquid can flow when the liquid's surface tension is broken. It is understood that many different types of sipper tubes can be used in conjunction with assembly 10 and the invention is not limited to use with tube 20 shown in FIG. 1.

Cap 30 is preferably formed of plastic, but it can also be formed from metal or any other appropriate material. Cap 30 includes a curved side wall 37. As shown in FIG. 1, wall 37 may include serrations on its outer surface in order to provide an improved gripping surface for a user. The inner surface of wall 37 is formed with threads so that cap 30 can be attached to bottle mouth 30. Extending from wall 37 is a top portion 32 of cap 30. Now considering FIG. 2a along with FIG. 1, a boss 34 extends perpendicularly from portion 32 and together they form a T-shape in cross section. Also, a circumferential rib 36 extends from the top portion of boss 34 and together they form an L-shape in cross section. A rigid cylindrical opening is defined by rib 36 that—as discussed below—is dimensioned to receive part of stopper 40. The opening is large enough so that sipper tube 20 may pass therethrough. Boss 34 and rib 36 serve multiple functions. Besides being configured to hold stopper 40, the they cause the entire structure of cap 30 to be more rigid. Other function and advantages of this design will be discussed below.

Stopper 40 is formed from rubber, or a material with similar properties, and includes a disk-shaped base 42. A cylindrical wall portion 46 rises from the center of base 42 and has a hole 49 which extends through the stopper as can be seen in FIG. 2b. A first groove 44 encircles wall portion 46 in base 42. Groove 44 is dimensioned to receive the bottom portion of boss 34 of cap 30. A second groove 48 is located on wall portion 46 in a position that corresponds to rib 36 of cap 30. In one embodiment, a channel 45—with an upper surface 60 and a lower surface 62—is formed along the bottom of base 42 and the surfaces are dimensioned to respectfully receive an upper surface 61 and inner surface 63 of bottle mouth 50. Described below are additional embodiments of cap 30 along with corresponding stoppers 40.

Figure 3A:
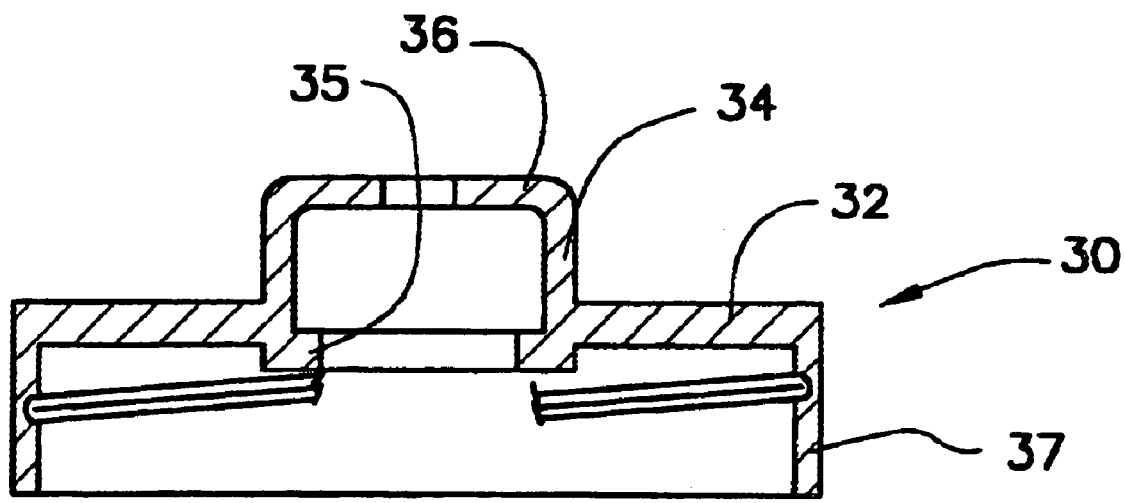
FIG. 3a is a cross sectional view depicting the cap detached from a standard threaded bottle, in accordance with another embodiment of the invention.
Figure 3B:
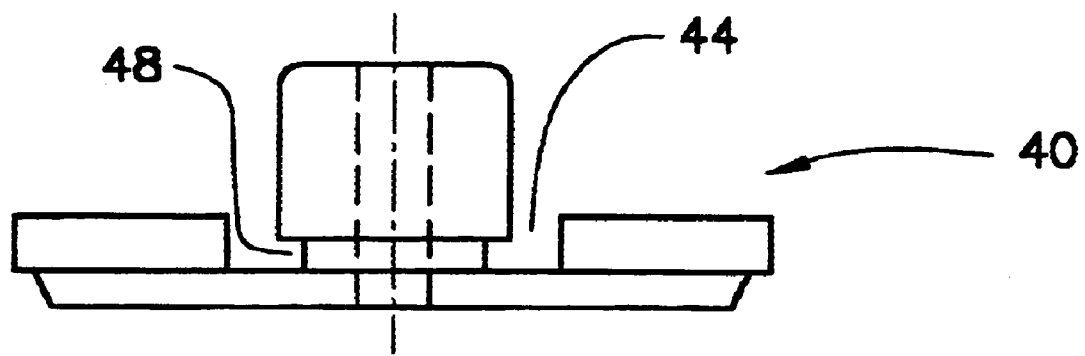
FIG. 3b is a cross sectional view depicting the stopper detached from a standard threaded bottle and configured to be coupled with the cap shown in FIG. 3a, in accordance with another embodiment of the invention.
Figure 8A:
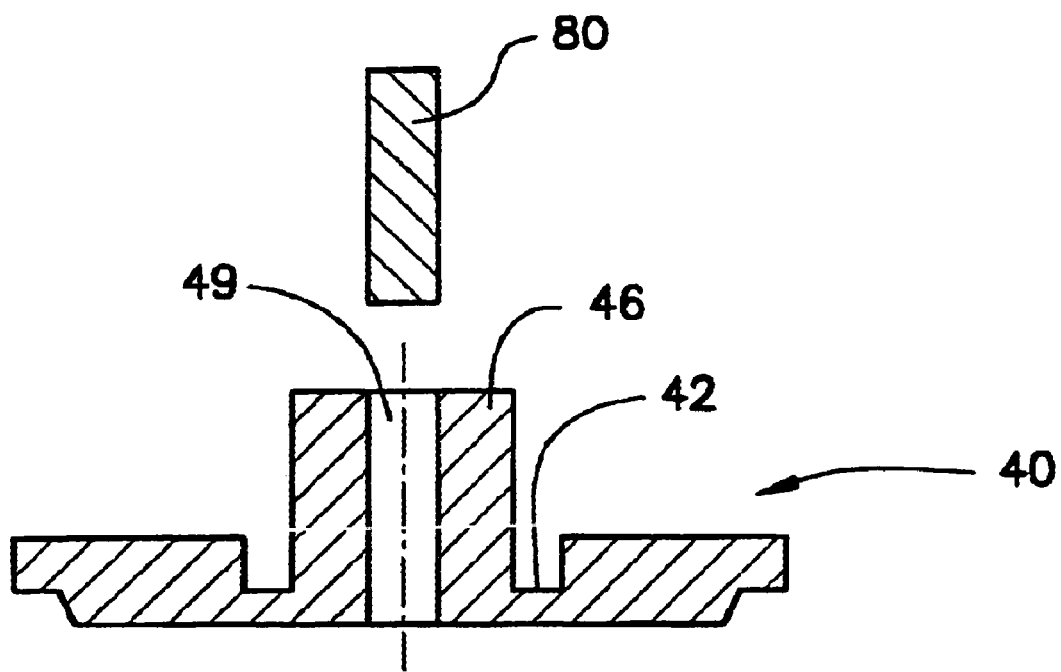
FIG. 8a is a cross sectional of a plug detached from the stopper shown in FIG. 4b, in accordance with one embodiment of the invention.
Figure 8B:
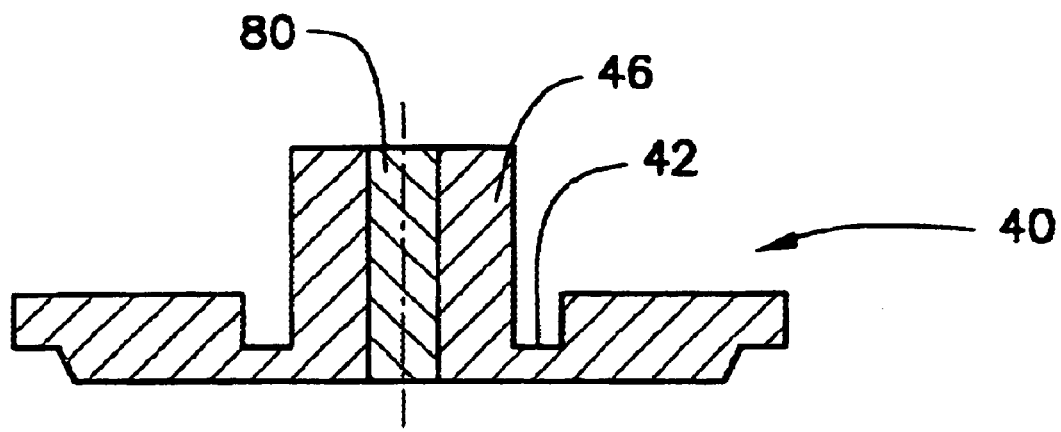
FIG. 8b is a cross sectional of a plug inserted into the stopper shown in FIG. 4b, in accordance with one embodiment of the invention.

In the embodiment shown in FIGS. 3a and 3b, second groove 48 is located at the base of wall portion 46 in a position that corresponds to a rib 35 of cap 30. In this embodiment, rib 36 is extended and serves to enclose stopper 40 when stopper 40 is inserted into cap 30. This enclosure helps to prevent collection of dirt between stopper 40 and cap 30. As shown in FIGS. 8a and 8b, a plug 80 may be provided that is sized to frictionally fit within hole 49. While FIGS. 8a and 8b illustrate such a plug as it is used with stopper 40 shown in FIG. 4b, it is understood that plug 80 can be used with any of the stopper embodiments. Plug 80 is useful for sealing hole 49 when tube 20 has not yet been inserted into hole 49. Thus, should bottle 50 be filled with liquid before tube 20 is inserted, plug 80 can be used to prevent spillage and evaporation of the contents of bottle 50. This is useful in at least two circumstances. Namely, it is often the case that bottles must be filled but they are not immediately needed. Also, at times bottles are used without sipper tubes. Instead bottles are drilled with side feeding holes that can be accessed by an animal. In this instance, it is desirable to completely seal the bottle. Plug 80 allows for both of these contingencies.

Figure 4A:
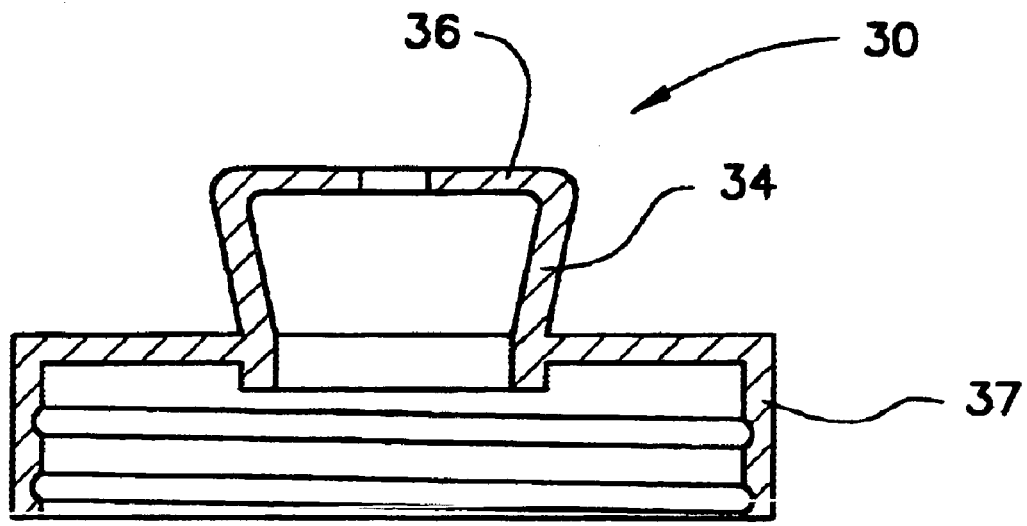
FIG. 4a is a cross sectional view depicting the cap detached from a standard threaded bottle, in accordance with another embodiment of the invention.
Figure 4B:
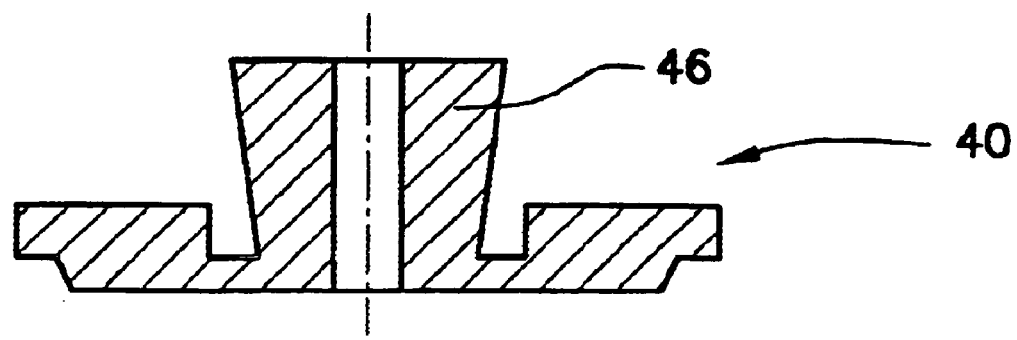
FIG. 4b is a cross sectional view depicting the stopper detached from a standard threaded bottle and configured to be coupled with the cap shown in FIG. 4a, in accordance with another embodiment of the invention.

In an additional embodiment, as shown in FIGS. 4a and 4b, wall portion 46 of stopper 40 is cone-shaped and therefore has a smaller lower diameter as compared to its upper diameter. In this embodiment, wall portion 46 lacks second ridge 48. However, cap 30 includes rib 36 which is designed to contain stopper 40. Instead, boss 34 of cap 30 is also cone-shaped to complement wall portion 46 of stopper 40.

Figure 5A:
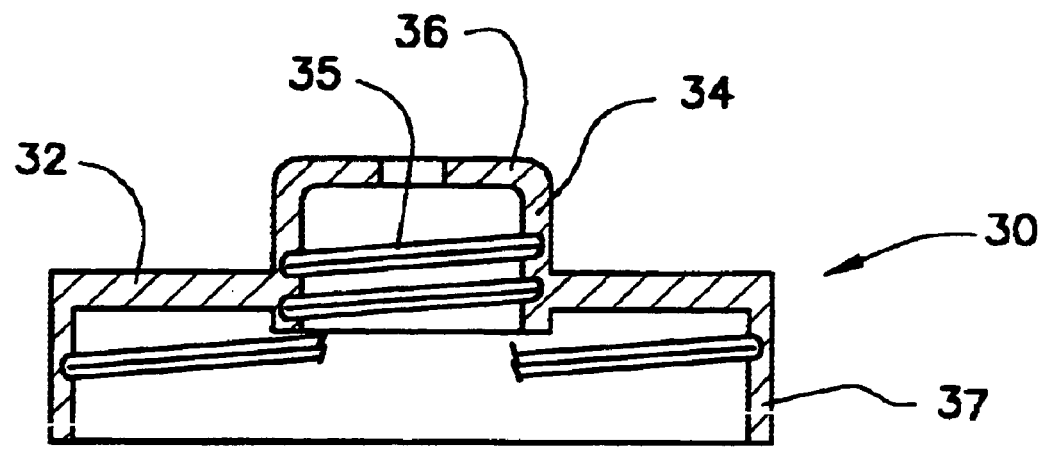
FIG. 5a is a cross sectional view depicting the cap detached from a standard threaded bottle, in accordance with another embodiment of the invention.
Figure 5B:
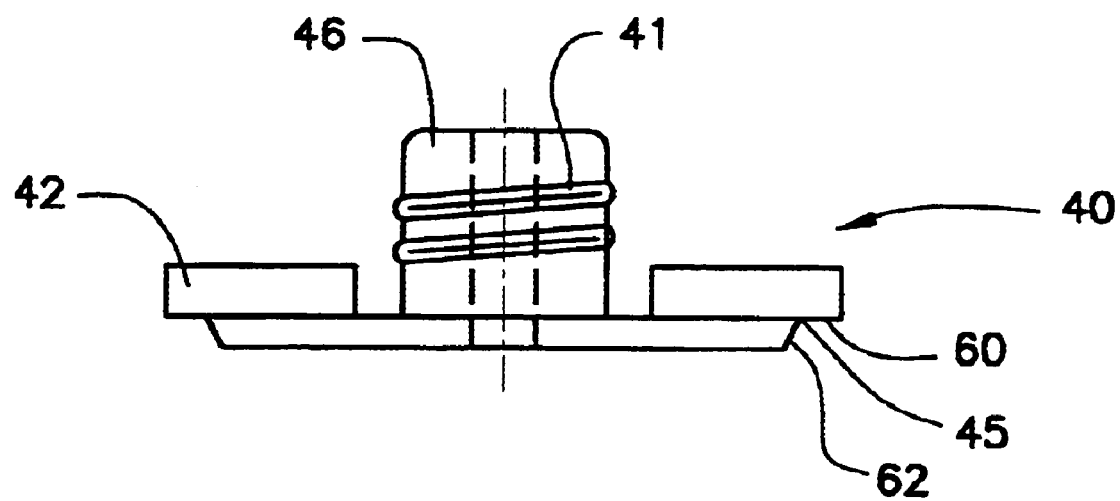
FIG. 5b is a cross sectional view depicting the stopper detached from a standard threaded bottle and configured to be coupled with the cap shown in FIG. 5a, in accordance with another embodiment of the invention.

In another embodiment, as shown in FIGS. 5a and 5b, wall portion 46 of stopper 40 has threads 41 disposed on its outer surface which are configured to engage threads 35 disposed on boss 34 of cap 30. In this embodiment, wall portion 46 lacks second ridge 48. However, cap 30 includes rib 36 which is designed to contain stopper 40.

Figure 6A:
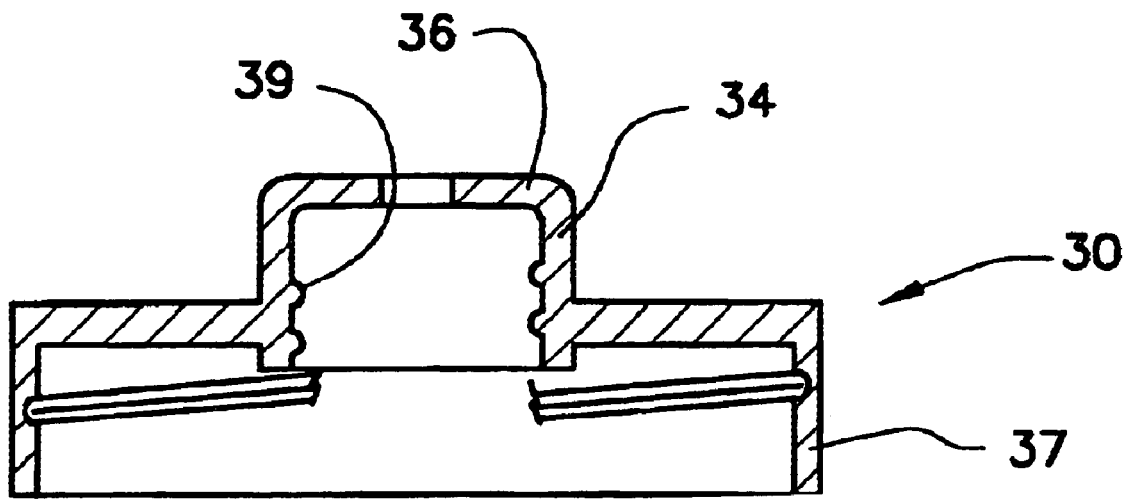
FIG. 6a is a cross sectional view depicting the cap detached from a standard threaded bottle, in accordance with another embodiment of the invention.
Figure 6B:
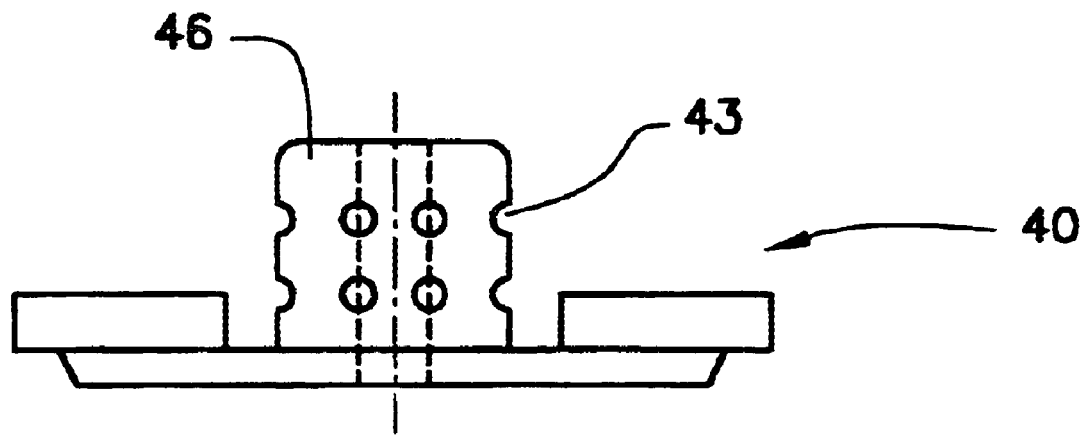
FIG. 6b is a cross sectional view depicting the stopper detached from a standard threaded bottle and configured to be coupled with the cap shown in FIG. 6a, in accordance with another embodiment of the invention.

In yet another embodiment, as shown in FIGS. 6a and 6b, wall portion 46 of stopper 40 includes one or more depressions 43 in the form of half-spheres, quarter-spheres, cones, or any other appropriate shape, that are dimensioned to receive corresponding protuberances 39 that are disposed on boss 34. Alternatively, protuberances may be disposed on stopper 40 and depressions may be disposed on boss 34. Once again, in this embodiment, wall portion 46 lacks second ridge 48. However, cap 30 includes rib 36 which is designed to contain stopper 40.

Figure 2A:
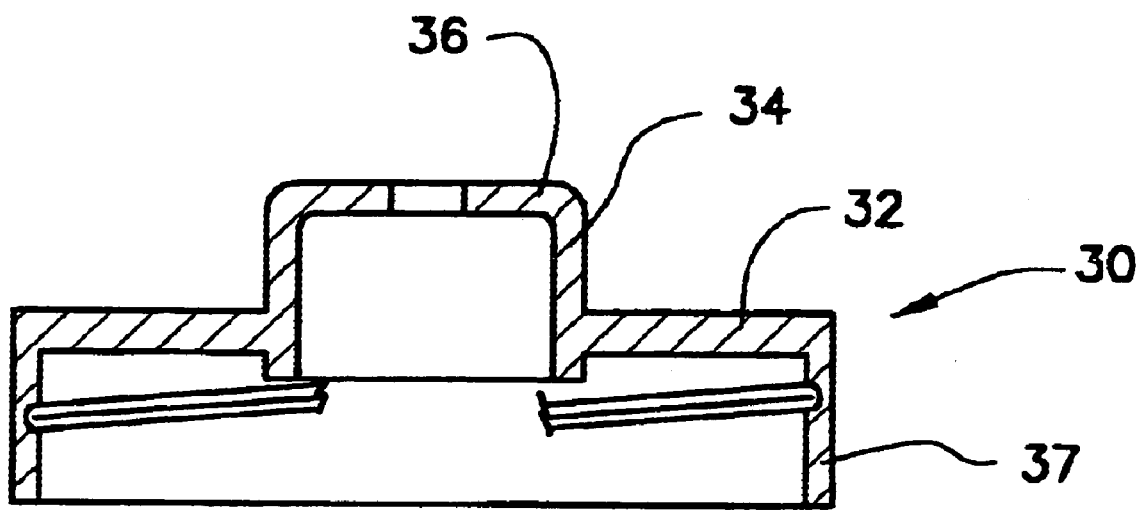
FIG. 2a is a cross sectional view depicting the cap of FIG. 1 detached from a standard threaded bottle, in accordance with one embodiment of the invention.
Figure 2B:
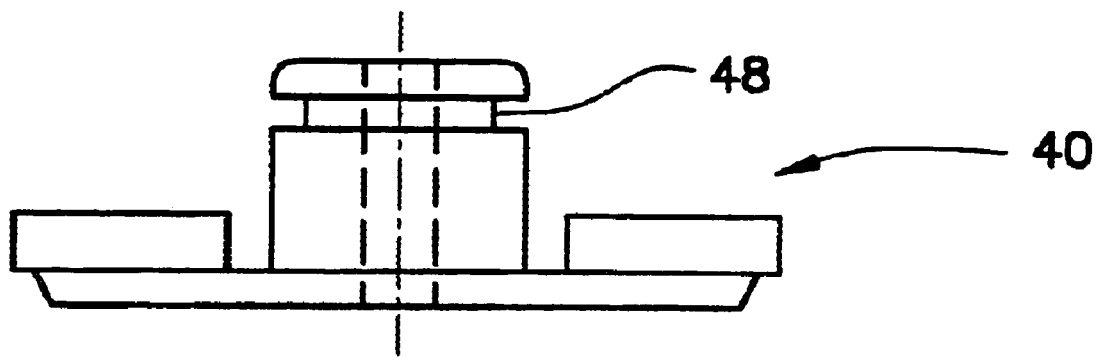
FIG. 2b is a cross sectional view depicting the stopper of FIG. 1 detached from a standard threaded bottle and configured to be coupled with the cap shown in FIG. 2a, in accordance with one embodiment of the invention.

Now turning more specifically to FIGS. 2a and 2b in addition to FIG. 1, an explanation can be given of the manner in which assembly 10 is used. Stopper 40 is fit into cap 30 by forcing part of wall portion 46 through the opening formed by boss 34 and rib 36. The diameter of portion 46 is wider than the diameter of the opening made by rib 36. Thus, in one embodiment, beveling on the top of portion 46 aids in forcing portion 46 through the opening. Also, the material itself is capable of being compressed and subsequently retains its original shape. Forcing the top of portion 46 through the opening allows rib 36 of cap 30 to engage second groove 48 of stopper 40. Likewise, boss 34 engages groove 44 of stopper 40. With stopper 40 in this position, base 42 is adjacent to the top portion 32. Finally sipper 20 can be inserted into opening 49, where it remains in place by friction fit.

As with the embodiment shown in FIGS. 2a and 2b, structural features of the embodiments shown in FIGS. 3, 4, 5, and 6 allow stopper to remain engaged to cap 30. Turning first to the embodiment shown in FIG. 4, cone-shaped wall portion 46 must be forced into complementary shaped opening formed by boss 34. Because the upper diameter of wall portion 46 is larger than the lower diameter of the opening formed by boss 34, stopper 40 remains engaged to cap 30 unless force is applied to separate the two components.

In the embodiment shown in FIG. 5, threads 41 on wall portion 46 of stopper 40 engage threads 35 on boss 34 of cap 30, so that stopper 40 is connected to cap 30. Stopper 40 is screwed on to cap until base 42 meets the underside of top portion 32 of cap 30. In the embodiment shown in FIG. 6 a multitude of protuberances 39 are positioned to mate with depressions 43 so that stopper 40 remains attached to cap 30 when base 42 is adjacent to the underside of top portion 32.

In one embodiment, cap 30 and stopper 40 are formed separately and then joined together as discussed above. Instead, stopper 40 may be molded using a previously formed cap 30 as a mold. In this instance, molten material is poured into cap 30 and sets to form stopper 40. This method can be used for any of the above embodiments of stopper 40 and cap 30. Thus, in the embodiment shown in FIGS. 5a and 5b, stopper 40 would take on a shape including threads 41.

Figure 7A:
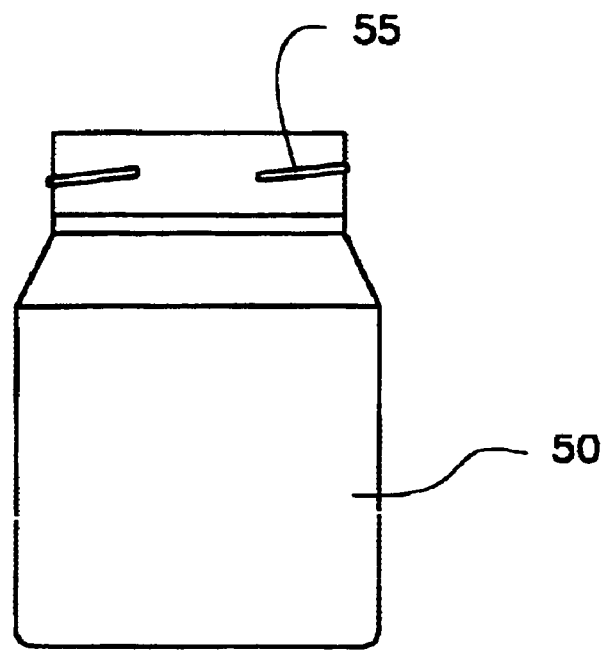
FIG. 7a is front view of a standard bottle, in accordance with another embodiment of the invention.
Figure 7B:
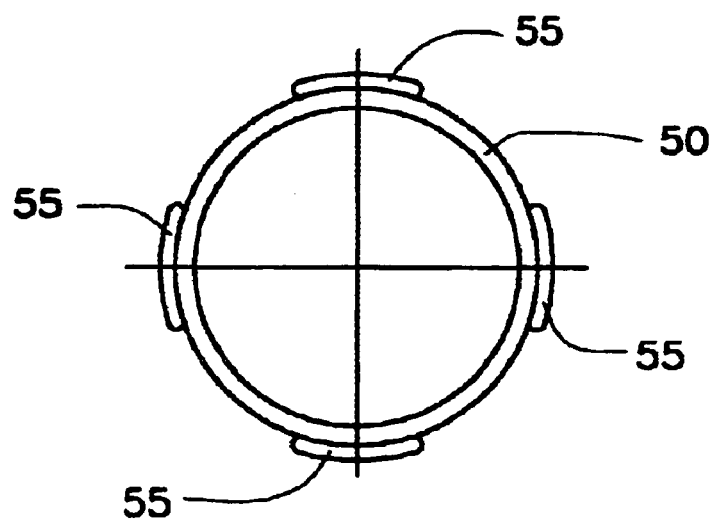
FIG. 7b is a top view of the standard bottle shown in FIG. 7a, in accordance with another embodiment of the invention.

For any of the previously described embodiments, when cap 30 is clamped down around bottle neck 50, the underside of base 42 of stopper 40 compresses to provide a biasing force to separate cap 30 from the bottle neck. So that stopper 40 seals against bottle 50 along two surfaces, as shown in FIG. 1, lower surface 62 of groove 45 engages inner surface 63 of bottle 40, and upper surface 60 engages upper surface 61 of bottle 40. In one embodiment, as shown in FIGS. 7a and 7b, four discreet threads 55 are disposed on bottle 50 and four corresponding threads are disposed on cap 30. It is understood that any number of threads may be disposed on bottle 50 and cap 30. The use of more than one continuous thread allows cap 30 to be tightened on bottle 50 with less than 360 degrees of turning. And, the use of multiple threads helps to create a seal along the full 360 degrees of cap 30. Attachment of assembly 10 to bottle 50 causes a tension fit and positive engagement of threads 34 and 54 so that the cap need only be rotated a relatively small amount to maintain a safe, tight fit. Furthermore, because the material is in a compressed state and seeks to expand, it provides a friction surface against the bottom of the cap further preventing any inadvertent loosening of the cap during use. Therefore, a tight seal is provided without twisting to engage all of the neck threads. This seal is improved by the relatively large surface area of stopper 40 that is in contact with cap 40. As compared to prior art assemblies, this surface area is increased by introducing boss 34 and rib 36.

At least one major advantage of the design herein described, is the cylinder shaped opening that is generally defined by boss 34 of cap 30. Unlike prior art caps, boss 34 provides lateral support for stopper 40. This support minimizes the range of motion of tube 20. In the prior art, a lack of support resulted in tube 20 being free to move in relatively unrestricted manner. This in turn may result in loosening the tube in the stopper. Also, the additional surface contact between cap 30 and stopper 40 serves to assure a water-tight seal. Another advantage of the presently described device is that the width of the opening formed in cap 30 for stopper 40 is relatively smaller than prior art openings. This is another factor which helps to improve the overall rigidity of assembly 10. Preferably the width of the opening is less than two times the height of the cylinder forming the opening. This further assures rigidity of the structure. Also disclosed have been features that were designed improve the overall cleanliness characteristics of a bottle feeder.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A removable cap assembly, comprising:
   a cap having a curved side wall having an inner surface and an outer surface, a top portion extending from said curved side wall, a boss extending perpendicularly from said top portion, said boss having a bottom and a top, a circumferential rib extending perpendicularly from said top of said boss, said boss and rib defining an opening in said cap, said opening having a width and a height;

a stopper dimensioned to seal said opening, said stopper having a hole therein configured to allow a fluid to flow therethrough, said stopper being maintained in said cap by said boss and rib, said stopper including a disc shaped base, a cylindrical wall portion extending from said base, a first groove in said base surrounding said wall portion, said first groove dimensioned to receive said bottom of said boss, a second circumferential groove at a top portion of said wall, said second groove dimensioned to receive said rib; and an appliance member adapted to be positioned within said hole and extending through said opening.

2. The assembly of claim 1, wherein said appliance member is a sipper tube.

3. The assembly of claim 1, wherein said appliance member is a plug.

4. The assembly of claim 1, wherein said stopper further comprises a channel formed in said base.

5. The assembly of claim 4, wherein said channel further comprises an upper surface and a lower surface, said upper surface of said channel dimensioned to receive an upper surface of a bottle and said lower surface of said channel dimensioned to receive an inner surface of a bottle to form a substantially tight seals therebetween.

6. The assembly of claim 1, further comprising a thread formed on said inner surface of said curved wall.

7. The assembly of claim 1, wherein said width of said opening is less than two times the height of said opening.

8. The removable cap assembly as claimed in claim 1 further comprising a plug dimensioned to seal said hole in said stopper.

* * * * *